(12) United States Patent
Tenereillo

(10) Patent No.: US 8,099,466 B2
(45) Date of Patent: Jan. 17, 2012

(54) SYSTEM AND METHOD FOR VOTE-BASED, INTEREST SPECIFIC COLLABORATION REGARDING LOCATION OF OBJECTS

(75) Inventor: Peter Tenereillo, Carlsbad, CA (US)

(73) Assignee: Reach Unlimited Corp., Cardiff by the Sea, CA (US)

( * ) Notice: Subject to any disclaimer, the term of this patent is extended or adjusted under 35 U.S.C. 154(b) by 1163 days.

(21) Appl. No.: 11/244,909

(22) Filed: Oct. 5, 2005

(65) Prior Publication Data

US 2006/0075023 A1 Apr. 6, 2006

Related U.S. Application Data

(60) Provisional application No. 60/616,020, filed on Oct. 5, 2004.

(51) Int. Cl.
*G06F 15/16* (2006.01)
*G06F 15/173* (2006.01)

(52) U.S. Cl. ......... 709/206; 709/224; 709/225; 709/217

(58) Field of Classification Search .................. 709/206, 709/224, 225, 217
See application file for complete search history.

(56) References Cited

U.S. PATENT DOCUMENTS

| | | | | |
|---|---|---|---|---|
| 3,803,605 A * | 4/1974 | Case et al. | ....................... | 342/95 |
| 4,864,313 A * | 9/1989 | Konneker | ..................... | 342/457 |
| 5,724,567 A * | 3/1998 | Rose et al. | ......................... | 707/2 |
| 6,078,281 A * | 6/2000 | Milkovich et al. | ............ | 342/196 |
| 6,275,707 B1 * | 8/2001 | Reed et al. | ................. | 455/456.3 |
| 7,236,798 B2 * | 6/2007 | Beuck | ......................... | 455/456.1 |
| 7,411,493 B2 * | 8/2008 | Smith | ....................... | 340/539.18 |
| 2002/0022920 A1 * | 2/2002 | Straub | ............................. | 701/93 |
| 2002/0049535 A1 * | 4/2002 | Rigo et al. | ..................... | 701/211 |
| 2002/0049742 A1 * | 4/2002 | Chan et al. | ......................... | 707/1 |
| 2002/0164995 A1 * | 11/2002 | Brown et al. | .................. | 455/456 |
| 2003/0005036 A1 * | 1/2003 | Mitzenmacher | ............... | 709/203 |
| 2003/0030571 A1 * | 2/2003 | Trajkovic et al. | ............. | 340/902 |
| 2003/0036848 A1 * | 2/2003 | Sheha et al. | .................. | 701/209 |
| 2004/0131032 A1 * | 7/2004 | Sendonaris et al. | .......... | 370/335 |
| 2005/0130676 A1 * | 6/2005 | Broussard et al. | .......... | 455/456.6 |
| 2005/0278371 A1 * | 12/2005 | Funk et al. | ..................... | 707/102 |
| 2006/0012514 A1 * | 1/2006 | Gomm | ..................... | 342/357.02 |
| 2009/0111462 A1 * | 4/2009 | Krinsky et al. | ................ | 455/423 |

* cited by examiner

Primary Examiner — Karen Tang

(74) Attorney, Agent, or Firm — Jon D. Shutter; Frank Kozak; Lisa Schoedel

(57) ABSTRACT

Systems, devices, and methods of generating location information for an object of interest are disclosed. The location information is based on dynamic input from one or more members of an interest group associated with the object. The input from the one or more members can be provided by users of a collaboration device. The collaboration device includes a GPS receiver, and a target input mechanism in communication with the GPS receiver. The target input mechanism is configured to receive a user indication of the presence of an object of interest to generate location data from the GPS receiver for the object of interest. The collaboration device further includes a radio configured for transmitting the location data to at least one other member of the interest group.

23 Claims, 2 Drawing Sheets

SYSTEM AND METHOD FOR VOTE-BASED, INTEREST SPECIFIC COLLABORATION REGARDING LOCATION OF OBJECTS

CROSS REFERENCE TO RELATED APPLICATIONS

The present application claims priority under 35 U.S.C. §119 to U.S. Provisional Application Ser. No. 60/616,020, filed Oct. 5, 2004, entitled A SYSTEM FOR VOTE-BASED, INTEREST-SPECIFIC, COLLABORATION REGARDING LOCATION OF OBJECTS the disclosure of which is incorporated herein by reference.

BACKGROUND

Today's society is highly mobile. Many people, including a vast majority in the United States, operate some kind of motor vehicle with which to get around, such as a car or a motorcycle. Interest groups within our mobile society have a strong desire to know the location of specific objects. For example, people in the sport bike and/or sports car crowd often wish to know the location of speed traps, i.e. hidden or semi-hidden mechanism by which law enforcement authorities target offenders of local speed ordinances. As another example, garage sale enthusiasts often want to know the location of garage sales within their area, so as to arrive early at a sale to purchase items for the purpose of reselling the same items at another garage sale venue.

There are many existing location-based services, but none tailored to be useful and safe for motor vehicle operators. Cell phone based services, such as Telstra, AUS, or speed trap SMS service (which was shut down in 2001) create driving hazards because cell phones are too difficult to use in a motor vehicle, particularly a motorcycle. Cell phone menus are too cumbersome to navigate, and voice recognition is still yet too unreliable.

SUMMARY

This document discloses systems, devices, and methods of generating location information for an object of interest based on dynamic input from one or more members of an interest group associated with the object. In one aspect, the input from the one or more members can be provided by users of a collaboration device. The collaboration device includes a GPS receiver, and a target input mechanism in communication with the GPS receiver. The target input mechanism is configured to receive a user indication of the presence of an object of interest to generate location data from the GPS receiver for the object of interest. The collaboration device further includes a radio configured for transmitting the location data to at least one other member of the interest group.

In another aspect, a system for vote-based, interest-specific collaboration to dynamically determine a location of a target object of interest is described. The system includes one or more members of an interest group, each of which utilizes the collaboration device summarized above. The system further includes a server in communication with the one or more members of the interest group. The one or more members of the interest group being associated by at least one object of interest. The radio transmitter and receiver is configured for sending and receiving the location data to and from the server. The collaboration device is configured for being coupled to a mobile vehicle of each of the one or more members of the interest group.

In yet another aspect, a method is described for collaborating among members of an interest group about the location of objects of interest associated with the interest group. The method includes the step of receiving a user indication of the presence of an object of interest from at least one of the members of the interest group. The method further includes the steps of accessing a GPS receiver based on the user indication, generating location data with the GPS receiver for the object of interest, and transmitting the location data to a central repository that is accessible to all members of the interest group.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
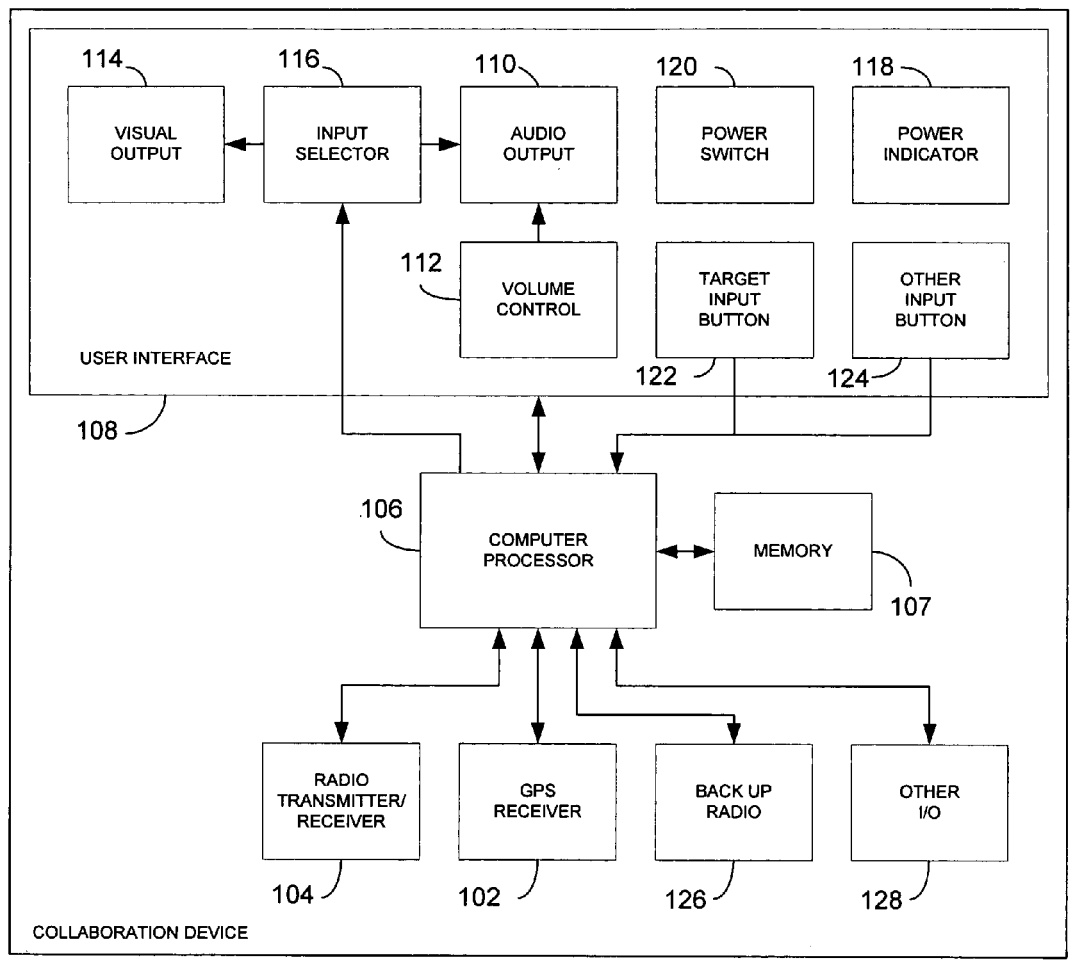
FIG. 1 illustrates a collaboration device in accordance with various embodiments.

This document describes a collaborative system and collaboration device for a user of a motor vehicle. The collaborative system provides location-based information of objects of interest for users who are part of an interest group. The collaborative system is easy-to-use and safe, especially for motor vehicle users who are mobile.

The collaborative system employs a collaboration device 100. The collaboration device 100 can be integrated and housed in an enclosure having the approximate dimensions of a conventional radar detector. The collaboration device 100 includes external input and output connections for connecting to various devices, such as a communication antenna, power supply, etc. The enclosure can be mountable to a portion of a motor vehicle, or connected as a standalone unit for being positioned anywhere in the motor vehicle.

The collaboration device 100 includes a global positioning system (GPS) receiver 102 for receiving geographical location and coordinate data, and a radio transmitter/receiver ("radio") 104 for communicating to and from a wireless communication network (not shown) such as a cellular telephone network. The GPS receiver 102 and radio 104 are under control of a computer processor 106. The computer processor 106 receives data and/or information signals from the GPS receiver 102 and radio 104, which can be stored in a memory 107 along with computer processor instructions. The computer processor 106 processes the data and information signals either based on inputs from a user of the collaboration device 100, or to output results of the processing to a user interface 108. Results of processing by the computer processor 106 can also be output to a server (not shown) via the wireless communication network.

The user interface 108 includes a number of user input and output mechanisms. Outputs of the user interface 108 include an audio output 110 such as a speaker positioned behind a speaker grille (not shown). The audio output 110 can be controlled and adjusted by a user-activatable volume control. The audio output 110 provides alerts, e.g. audible tones from the speaker.

The user interface 108 also can include a visual output 114 such as a graphical display screen or an array of light emitting diodes (LEDs). The user interface 108 includes a target input button 122 that is activated by a user whenever an object of interest, or "target," is sighted by the motorist or user. For example, a motorist that sees a speed trap will activate target input button 122 so that the GPS receiver 102 determines and stores the location of the collaboration device 100 at the time of sighting, and thus the location of the target object of interest. The target input button 122 can also be a switch, a knob or even a remotely controlled user-activatable control mechanism (i.e. for motorcycle applications, for example).

In some embodiments, the target input button 122 is activated by the user simply pushing a button for a short period of time, i.e. under 2 seconds. The target input button 122 can also recognize more than one type of input signal, depending on the length of time the button is depressed. For instance, if the button is pushed and held in a depressed position by a user for greater than 2 seconds, the computer processor 106 will register a "false input." Accordingly, the target input button 122 can receive two or more logical inputs, and where one input can override or "vote against" a previous input.

An input selector 116, such as a dial or a switch, allows a user to select a list of up to N objects of interest (i.e. "the interest list"), from which to choose when activating the target input button 122. Accordingly, the interest list will be associated with the target input button 122 and vice versa, so that irrelevant information is not recorded.

A specialized visual output is a power indicator 118, such as a single LED, that indicates whether the collaboration device 100 is adequately being powered with electricity. The power to the collaboration device 100 is controlled by power switch 120, which provides "on" and "off" switching of power to the collaboration device 100. The user interface 108 may also include one or more other input buttons 124 for receiving alternative inputs, such as a radar or laser detector, or any other external input that can help identify an object of interest from the interest list. For example, the other input button 124 could be used by a particular interest group for receiving 802.11 network scanner signals.

The collaboration device 100 may also include a back-up radio 126. The back-up radio 126 may be a wireless communication device that can be used as an alternative to, or in place of, the radio transmitter/receiver 104. In one embodiment, the back-up radio 126 is a peer-to-peer wireless communication system, such as a citizen's band (CB) radio, a walkie-talkie-type communication device, or the like. The collaboration device 100 can also have other input/output ports 128 for scalability and flexibility. For instance, the collaboration device 100 can include a universal serial bus (USB) or Firewire connection for connecting to an external storage device, or a power connection for connecting to an alternative external power supply. The other input/output ports 128 can be used for any purpose.

When a user presses or otherwise activates the target input button 122, they cast a "vote" that a target (as defined by the interest group associated with the select input dial) was identified at the current GPS coordinates. As more votes are cast within a similar vicinity, a confidence level in the location increases. False-inputs are currently treated as an additional type of input, but in alternative implementations could decrement the confidence level. Also, for tracking of moving targets, multipliers could be applied to confidence levels based on proximity. For example, if a second input occurs within diameter X of a first input, it could count as 2 votes, but if the second input occurs within diameter Y of a first input (where Y>X) it would count as only one vote. The initial implementation will assume a fixed diameter as a "same location" (and use a default value, for example 100 meters), and multiple votes that are not within the fixed diameter will appear (and sound alerts) as different targets.

Figure 2:
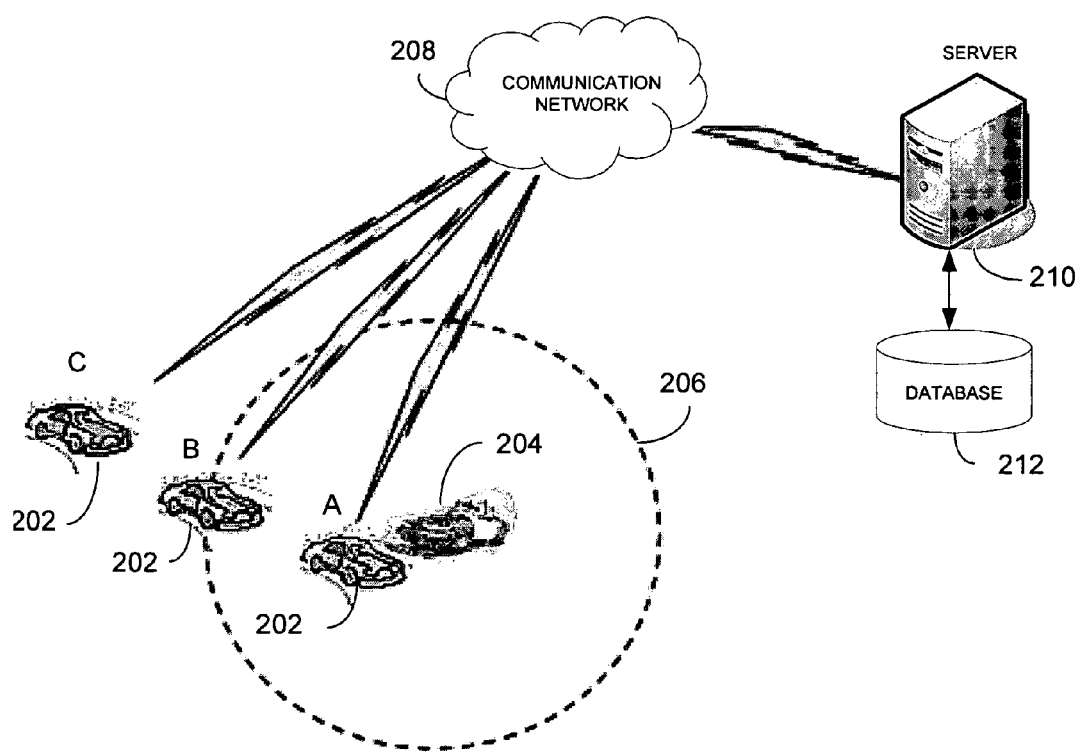
FIG. 2 illustrates a collaborative system for providing location-based collaboration among members of an interest group.

FIG. 2 illustrates a collaborative system 200 for vote-based, interest-specific location and identification of objects of interest. The collaborative system 200 allows one or more members of an interest group 202 to locate and identify a target object of interest 204 from N objects of interest within a predefined geographical zone 206 or area. Each of the members of the interest group 202 use a collaboration device 100 as described above to send object location information over one or more wireless communication networks 208 to a server 210. The server 210 processes the object location information, stores the processed information in a database 212, and/or sends the processed information to other members of the interest group 202 via the one or more wireless communication networks 208. The server 210 also provisions the collaboration devices, i.e. associates input select data with interest groups, collaboration device synching, etc. Accordingly, all subscribing members of the interest group 202 who are utilizing a collaboration device have near real-time object location information about objects of interest from all other members of the interest group 202.

The server 210 also hosts a subscription website and location data repository. When a user orders a collaboration device, that user must also register that collaboration device serial number with the subscription site. The subscription site is where the user activates the collaboration device, and specifies their user profile. In the user profile, the user chooses the interest list(s) they would like to subscribe to. For example, the user may want to subscribe to the following interest lists: police; garage sales; and available wireless networks. The types of interest lists are virtually unlimited, however the number of such lists subscribed to by any particular user can be limited by subscription.

The user profile also associates interest lists with the enumerators on the input-select dial on the collaboration device, configures the desired alert tone (i.e. default "blap"), the desired alert diameter (i.e. default 1 mile), the desired false-input diameter (i.e. default 2 miles), and the desired staleness settings. Staleness represents the age of a previous input as compared to a configured parameter. For example if an operator has a configured staleness time of 30 minutes and that operator approaches the location of a previous input that was entered 16 minutes ago, that input is not considered stale. However if another operator approaches the same location but has a configured staleness time of 15 minutes, that input is considered stale. In an example, the staleness alert time can be set to a default of 15 minutes, after which period of time a different tone emits. Further, the staleness no-alert time can be set to a default of 30 minutes, after which period of time no tone emits. The desired false alert tone can also be set (i.e. default "bleep").

The server 210 and its associated subscription web site also allows users to participate in web logging ("blogging"). Because the collaborative system is a voting-based system, the quality of inputs can be greatly improved by coaching, agreement and understanding within the interest group. The blogging is secure and is limited to subscribers to specific interest groups.

The following specific examples illustrate various general collaborative methods that can be performed on the collaborative system 200 using the collaboration devices 100. With reference to FIG. 2, driver A sights a target object of interest 204 (i.e. police car speed trap), and presses the target input button on his collaboration device. Driver A's collaboration device uploads the GPS coordinates and the event. The system 200 has received no previous inputs for this location, therefore the confidence level is now 1. Driver B now visually sights the target object of interest 204, and presses the target input button of his collaboration device. Driver B's collaboration device uploads the GPS coordinates and the event. If the GPS coordinates are within a "confidence zone" (a parameter set at the discretion of the service), it is assumed to be the same target. The confidence level is now 2. If the coordinates are not the same, but are close, tracking algorithms are used to develop a model of the target object of interest 204 (of a moving police car, for example).

In accordance with another example, and carrying on the speed trap example, driver A sights a target object of interest 204, and presses the target input button. Driver A's collaboration device uploads the GPS coordinates and the event. The system has received no previous inputs for this location, therefore the confidence level is now 1. Driver B has configured a ¼ mile radius alert zone, and comes within ¼ mile of driver A's alert location, but does so after his configured staleness-alert setting of 15 minutes (which is the default). Driver B has configured "bleep" as his desired stale alert setting, therefore driver B hears a single "bleep."

Driver B scans the area and does not see the target object of interest 204. Driver B then presses the target input button and holds it for 2 seconds, thereby registering a false-input vote. Driver C has configured a ⅛ mile radius alert zone, and comes within ⅛ mile of driver As input location. Thus, driver C hears two tones, "blap, bleep", representing driver A's input, and driver B's false-input. All members of the interest group 202 utilize voting-based, interest-specific systems and methods to determine the location of target objects of interest, or the logical converse, the non-presence of a target object of interest at a particular location.

The collaborative system can integrate a web-based map generator such as MapQuest™ or Google Earth™, to provide real-time, color coded symbols or "blips" based on user inputs. The collaborative system can also generate color-coded confidence levels or confidence level zones on maps provided by such map generators. The collaboration device can be integrated with Original Equipment Manufacturer (OEM) navigational systems in automobiles, or as an after-market option.

The collaborative system can also be integrated with one or more marketing systems, i.e. systems in which subscribers submit their names or other personal information for targeted advertising. For example, if a member of an interest group is a mother, and her profile states that she has two children, then as she passes a furniture store or clothing sale (as determined by the GPS receiver), she may be alerted of the location of the store or sale through her collaboration device and offered a special member service or discount. In some embodiments, such member may be required to submit a response signal via the target input button.

Embodiments of the collaborative system and all of the functional operations described in this specification can be implemented in digital electronic circuitry, or in computer software, firmware, or hardware, including the structures disclosed in this specification and their structural equivalents, or in combinations of them. Embodiments of the collaborative system can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., the radio transmitter/receiver 104, a personal digital assistant (PDA), a mobile audio player, the GPS receiver 102, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM.

Although a few embodiments have been described in detail above, other modifications are possible. Other embodiments may be within the scope of the following claims.

The invention claimed is:

1. A system for vote-based, interest-specific collaboration to generate information of a target object of interest, the system comprising:
    a server in communication with one or more members of a predetermined interest group from among a plurality of predetermined interest groups, the one or more members of the predetermined interest group being associated by at least one object of interest, the server storing the target object information in a database; and
    a collaboration device coupled to a mobile vehicle of each of the one or more members of the predetermined interest group, the collaboration device comprising:
    a GPS receiver;
    a target input mechanism in communication with the GPS receiver receiving a user indication of the presence of an object of interest to generate location data from the GPS receiver for the object of interest; and
    a radio transmitter and receiver sending and receiving target object information to and from the server, the target object information comprising the user indication of the presence of the object of interest and the location data of the member when sending the user indication of the presence of the object of interest;
    wherein a confidence level of the target object information for the presence of the object of interest is adjusted upon receipt of the user indication of the presence of the object of interest wherein the confidence level is increased as the location data from the GPS receiver indicates that the user indication was sent from a location that was within a fixed diameter of a previously received location for the object of interest, wherein the confidence level is adjusted upon receipt of the user indication of an absence of the object of interest such that the confidence level is decreased.

2. The system in accordance with claim 1, further comprising a wireless communication network used by the server and the radio transmitter and receiver to communicate the location data of the object of interest.

3. The system in accordance with claim 1, further comprising a computer processor configured to generate a confidence level representing a likelihood of the location of the object of interest.

4. The system in accordance with claim 3, wherein the computer processor is provided in the collaboration device.

5. The system in accordance with claim 3, wherein the computer processor is provided in the server.

6. The system in accordance with claim 1, wherein the server is further configured to generate a location model of the object of interest based on one or more user indications of the location of the object of interest.

7. The system in accordance with claim 1, wherein the collaboration device further includes an audio output for generating an audio signal based on the user indication of the location of the object of interest.

8. The system in accordance with claim 6, wherein the server generates a confidence level indicator based on one or more user indications, the confidence level indicator representing a likelihood of the actual location of the object of interest.

9. The system in accordance with claim 8, wherein the server receives multiple user indications wherein a user indication comprising a false input indication reduces the generated confidence level indicator.

10. The system in accordance with claim 6, wherein the location model comprises assigning a first location data corresponding to a first user indication of an object of interest to a second user indication of an object of interest having second location data within a fixed diameter of the first location data.

11. A collaboration device associated with each of one or more members of a predetermined interest group, the collaboration device comprising:
    a GPS receiver;
    a target input mechanism in communication with the GPS receiver receiving a user indication of the presence of a speed trap to generate location data from the GPS receiver for the speed trap; and
    a radio transmitting target object information comprising the user indication of the presence of the speed trap and the location data to at least one other member of the interest group;
    wherein a confidence level of the target object information for the presence of the speed trap is adjusted upon receipt of the user indication of the presence of the speed trap wherein the confidence level is increased as the location data from the GPS receiver indicates that the user indication was sent from a location that was within a fixed diameter of a previously received location for the speed trap, wherein the confidence level is decreased upon receipt of the user indication of an absence of the speed trap.

12. A collaboration device in accordance with claim 11, further comprising an audio output generating an audio signal based on the user indication of the location of the object of interest.

13. A collaboration device in accordance with claim 11, wherein the radio is further configured to receive location data from at least one other member of the interest group.

14. A collaboration device in accordance with claim 11, further comprising a computer processor configured controlling the GPS receiver and the target input mechanism.

15. A collaboration device in accordance with claim 11, wherein the target input mechanism is a user-controlled button.

16. A collaboration device in accordance with claim 11, further comprising an input selector mechanism allowing a user to select the object of interest from a set of objects of interest.

17. A collaboration device in accordance with claim 11, further comprising an enclosure that houses the GPS receiver, the target input mechanism, and the radio.

18. A collaboration device in accordance with claim 11, wherein the radio includes a cellular telephone transmitter and receiver.

19. A method for collaborating among members of a predetermined interest group from among a plurality of predetermined interest groups about the location of objects of interest associated with the predetermined interest group, the method comprising:
    receiving a user indication of the presence of an object of interest from at least one of the members of the predetermined interest group;
    accessing a GPS receiver based on the user indication;
    generating location data with the GPS receiver for location of the member corresponding to location of the object of interest;
    transmitting target object information comprising the user indication of the presence of the object of interest and the location data to a central repository that is accessible to all members of the interest group; and
    generating a confidence level indicator based on one or more user indications, the confidence level indicator representing a likelihood of the actual location of the object of interest, wherein the user indication comprising a false input indication reduces the confidence level indicator, wherein the confidence level indicator is increased as the location data from the GPS receiver indicates that the user indication was sent from a location that was within a fixed diameter of a previously received location for the object of interest.

20. A method in accordance with claim 19, further comprising disseminating the location data for the object of interest to at least one other member of the interest group.

21. A method in accordance with claim 19, wherein receiving a user indication further comprises:
   providing a target input button in a mobile vehicle used by the user; and
   generating an electrical signal representing the user indication upon user activation of the target input button.

22. A method in accordance with claim 19, further comprising generating a location model of the object of interest based on one or more user indications.

23. A method in accordance with claim 22, wherein generating the location model comprises assigning a first location data corresponding to a first user indication of an object of interest to a second user indication of an object of interest having second location data within a fixed diameter of the first location data.

* * * * *